US012670647B2

(12) United States Patent
Zhang

(10) Patent No.: US 12,670,647 B2
(45) Date of Patent: Jun. 30, 2026

(54) METHOD FOR DISPLAYING TRANSITION ANIMATION ON RETRACTABLE SCREEN, NON-TRANSITORY COMPUTER-READABLE STORAGE MEDIUM, AND ELECTRONIC DEVICE

(71) Applicant: GUANGDONG OPPO MOBILE TELECOMMUNICATIONS CORP., LTD., Dongguan (CN)

(72) Inventor: Ping Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 280 days.

(21) Appl. No.: 18/494,840

(22) Filed: Oct. 26, 2023

(65) Prior Publication Data

US 2024/0054708 A1      Feb. 15, 2024

Related U.S. Application Data

(63) Continuation of application No. PCT/CN2022/083910, filed on Mar. 30, 2022.

(30) Foreign Application Priority Data

Apr. 28, 2021    (CN) .......................... 202110466045.8

(51) Int. Cl.
*G06T 13/00* (2011.01)
*G06F 1/16* (2006.01)
*G06F 3/147* (2006.01)

(52) U.S. Cl.
CPC ............ *G06T 13/00* (2013.01); *G06F 1/1624* (2013.01); *G06F 1/1652* (2013.01); *G06F 3/147* (2013.01)

(58) Field of Classification Search
CPC ..... G06T 13/00; G06F 1/1624; G06F 1/1652; G06F 3/147; G06F 2203/04803;
(Continued)

(56) References Cited

U.S. PATENT DOCUMENTS

2007/0153006 A1    7/2007  Robbins et al.
2018/0061110 A1    3/2018  Flores
(Continued)

FOREIGN PATENT DOCUMENTS

CN          103916706        7/2014
CN          104461443        3/2015
(Continued)

OTHER PUBLICATIONS

CNIPA, First Office Action for CN Application No. 202110466045. 8, Jan. 13, 2022.
(Continued)

*Primary Examiner* — Devona E Faulk
*Assistant Examiner* — Donna J. Ricks
(74) *Attorney, Agent, or Firm* — Hodgson Russ LLP

(57) ABSTRACT

A display method, a non-transitory computer-readable storage medium, and an electronic device relates to the field of data processing. The method includes the following. A current state of the retractable screen is monitored, where the current state includes a static state and a motion state. A target transition animation is obtained when detecting that the retractable screen is switched from the static state to the motion state, where the change in the target transition animation corresponds to the motion state. A current image displayed on the retractable screen in the static sate is replaced with the target transition animation.

19 Claims, 13 Drawing Sheets

(58) Field of Classification Search
CPC .... G06F 3/0481; G06F 3/0483; G06F 1/1677;
G06F 3/0484; H04M 1/0235; H04M
1/0268; H04M 1/72454; H04M 1/0241
See application file for complete search history.

(56) References Cited

U.S. PATENT DOCUMENTS

| | | | |
|---|---|---|---|
| 2019/0261519 A1* | 8/2019 | Park | H04M 1/0235 |
| 2020/0225706 A1 | 7/2020 | Jung et al. | |
| 2022/0269463 A1* | 8/2022 | Yu | G09G 3/035 |

FOREIGN PATENT DOCUMENTS

| | | |
|---|---|---|
| CN | 110045936 | 7/2019 |
| CN | 110072012 | 7/2019 |
| CN | 111708506 | 9/2020 |
| CN | 112035010 | 12/2020 |
| CN | 112269555 | 1/2021 |
| CN | 112558898 | 3/2021 |
| JP | 2014130419 | 7/2014 |
| RU | 2724124 | 6/2020 |
| WO | 2021047251 | 3/2021 |

OTHER PUBLICATIONS

CNIPA, Second Office Action for CN Application No. 202110466045. 8, Jun. 13, 2022.
CNIPA, Notification to Grant Patent Right for Invention for CN Application No. 202110466045.8, Oct. 24, 2022.
WIPO, International Search Report and Written Opinion for International Application No. PCT/CN2022/083910, Jun. 14, 2022.
EPO, Extended European Search Report for EP Application No. 22794474.1, Sep. 9, 2024.

* cited by examiner

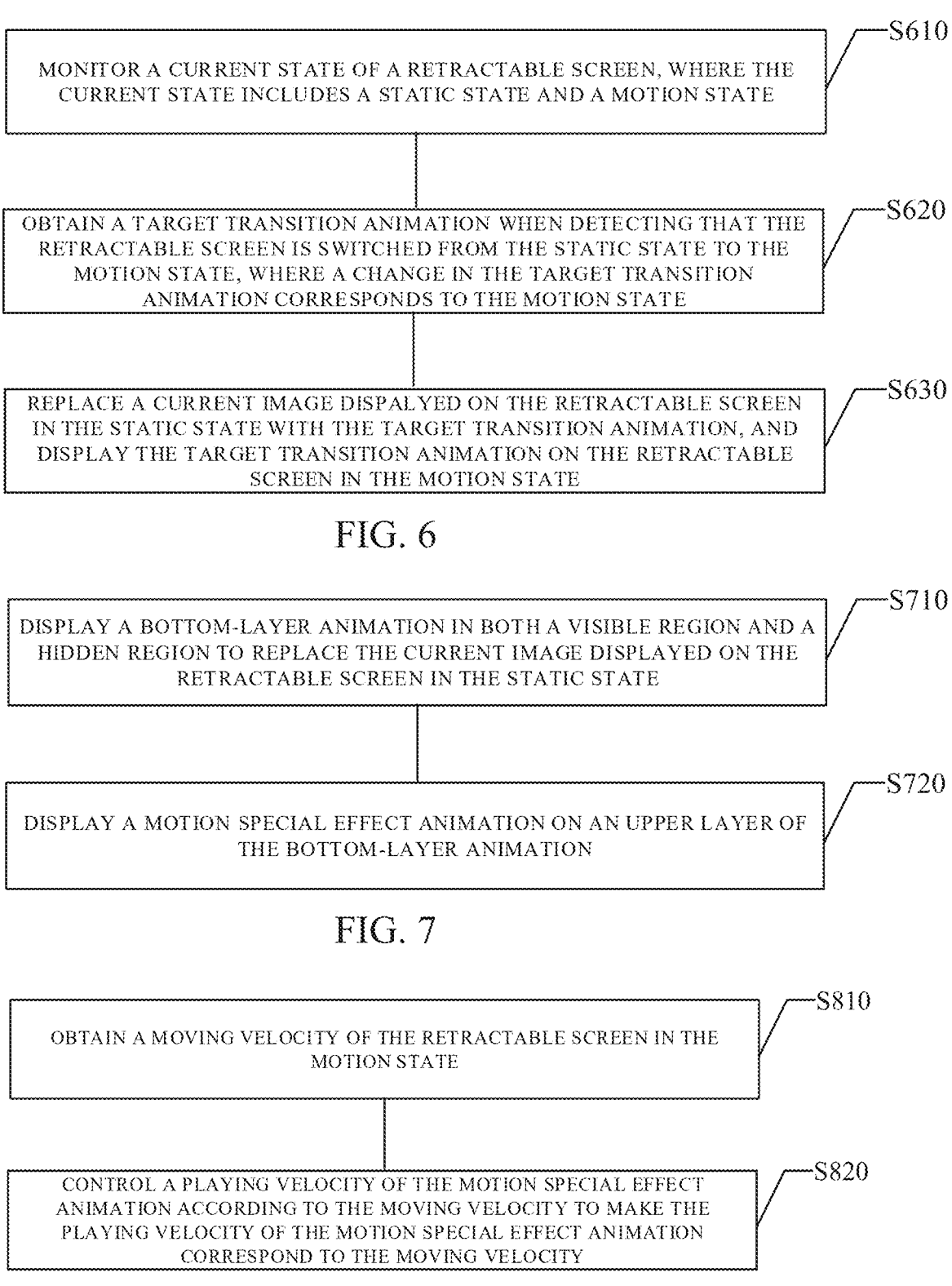

MONITOR A CURRENT STATE OF A RETRACTABLE SCREEN, WHERE THE CURRENT STATE INCLUDES A STATIC STATE AND A MOTION STATE ⎯S610

OBTAIN A TARGET TRANSITION ANIMATION WHEN DETECTING THAT THE RETRACTABLE SCREEN IS SWITCHED FROM THE STATIC STATE TO THE MOTION STATE, WHERE A CHANGE IN THE TARGET TRANSITION ANIMATION CORRESPONDS TO THE MOTION STATE ⎯S620

REPLACE A CURRENT IMAGE DISPALYED ON THE RETRACTABLE SCREEN IN THE STATIC STATE WITH THE TARGET TRANSITION ANIMATION, AND DISPLAY THE TARGET TRANSITION ANIMATION ON THE RETRACTABLE SCREEN IN THE MOTION STATE ⎯S630

FIG. 6

DISPLAY A BOTTOM-LAYER ANIMATION IN BOTH A VISIBLE REGION AND A HIDDEN REGION TO REPLACE THE CURRENT IMAGE DISPLAYED ON THE RETRACTABLE SCREEN IN THE STATIC STATE ⎯S710

DISPLAY A MOTION SPECIAL EFFECT ANIMATION ON AN UPPER LAYER OF THE BOTTOM-LAYER ANIMATION ⎯S720

FIG. 7

OBTAIN A MOVING VELOCITY OF THE RETRACTABLE SCREEN IN THE MOTION STATE ⎯S810

CONTROL A PLAYING VELOCITY OF THE MOTION SPECIAL EFFECT ANIMATION ACCORDING TO THE MOVING VELOCITY TO MAKE THE PLAYING VELOCITY OF THE MOTION SPECIAL EFFECT ANIMATION CORRESPOND TO THE MOVING VELOCITY ⎯S820

FIG. 8

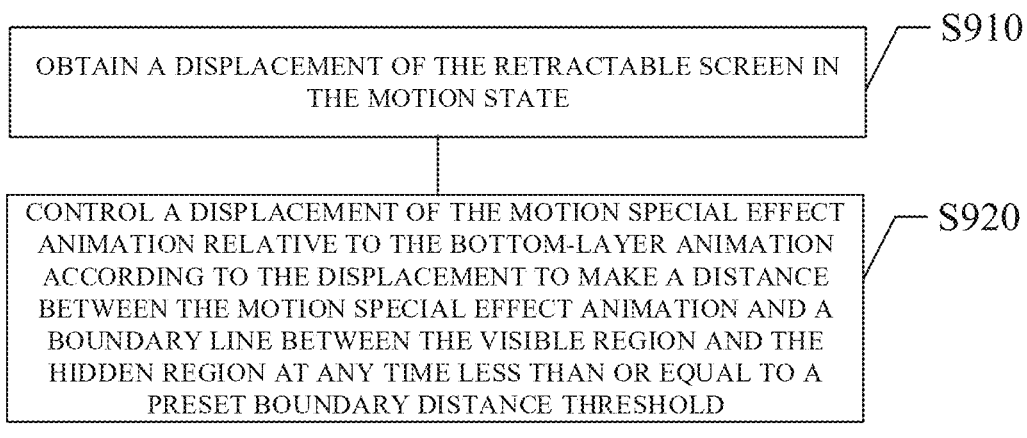

S910

OBTAIN A DISPLACEMENT OF THE RETRACTABLE SCREEN IN THE MOTION STATE

S920

CONTROL A DISPLACEMENT OF THE MOTION SPECIAL EFFECT ANIMATION RELATIVE TO THE BOTTOM-LAYER ANIMATION ACCORDING TO THE DISPLACEMENT TO MAKE A DISTANCE BETWEEN THE MOTION SPECIAL EFFECT ANIMATION AND A BOUNDARY LINE BETWEEN THE VISIBLE REGION AND THE HIDDEN REGION AT ANY TIME LESS THAN OR EQUAL TO A PRESET BOUNDARY DISTANCE THRESHOLD

FIG. 9

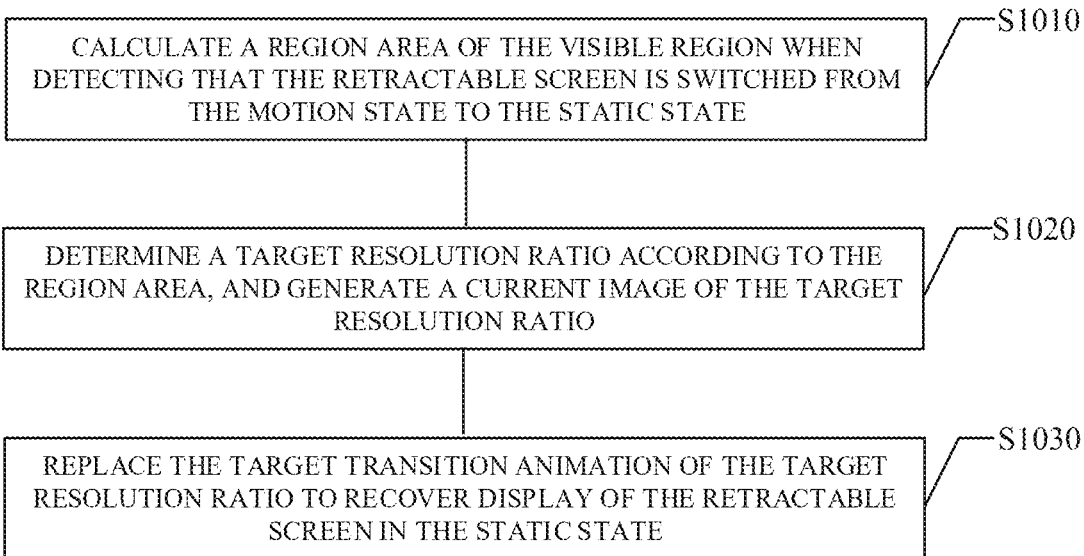

S1010

CALCULATE A REGION AREA OF THE VISIBLE REGION WHEN DETECTING THAT THE RETRACTABLE SCREEN IS SWITCHED FROM THE MOTION STATE TO THE STATIC STATE

S1020

DETERMINE A TARGET RESOLUTION RATIO ACCORDING TO THE REGION AREA, AND GENERATE A CURRENT IMAGE OF THE TARGET RESOLUTION RATIO

S1030

REPLACE THE TARGET TRANSITION ANIMATION OF THE TARGET RESOLUTION RATIO TO RECOVER DISPLAY OF THE RETRACTABLE SCREEN IN THE STATIC STATE

DISPLAY APPARATUS

STATE MONITORING MODULE          1610

ANIMATION OBTAINING MODULE          1620

IMAGE REPLACING MODULE          1630

ELECTRONIC DEVICE

PROCESSOR
1701

MEMORY 1702

EXECUTABLE INSTRUCTIONS

METHOD FOR DISPLAYING TRANSITION ANIMATION ON RETRACTABLE SCREEN, NON-TRANSITORY COMPUTER-READABLE STORAGE MEDIUM, AND ELECTRONIC DEVICE

CROSS-REFERENCE TO RELATED APPLICATION(S)

This application is a continuation of International Application No. PCT/CN2022/083910, filed Mar. 30, 2022, which claims priority to Chinese Patent Application No. 202110466045.8, filed Apr. 28, 2021, the entire disclosures of which are hereby incorporated by reference.

TECHNICAL FIELD

This disclosure relates to the field of data processing, in particular to a display method, a non-transitory computer-readable storage medium, and an electronic device.

BACKGROUND

With the increasing improvement of living standards, people are paying more attention on screens of electronic devices. In order to ensure that a large display screen size of mobile terminals and a small volume of mobile terminals, flexible displays are increasingly applied in mobile terminals to make retractable screens, such as a scroll screen, a foldable screen, and a movable screen that can be retracted into a terminal housing.

Currently, when the retractable screen extends or retracts, a current image displayed in real-time is generally adjusted based on an extension degree or retraction degree. However, adjusting the current image in real-time results in large system computation, and changes of the current image may not keep up with the extension or retraction of the retractable screen, resulting in a mismatch between the image display and a visible region of the retractable screen, thus the smoothness of image display is poor.

SUMMARY

The disclosure is to provide a display method, a computer-readable storage medium, and an electronic device, thus improving at least to a certain extent matching between a displayed image and a visible region of a retractable screen during the extension and retraction of a retractable screen, which may lead to smooth image display, low system computation, and high system performance.

In a first aspect of the disclosure, a display method is provided. The method includes the following. A current state of the retractable screen is monitored, where the current state includes a static state and a motion state. A target transition animation is obtained when detecting that the retractable screen is switched from the static state to the motion state, where a change in the target transition animation corresponds to the motion state. A current image displayed on the retractable screen in the static state is replaced with the target transition animation, and the target transition animation is displayed on the retractable screen in the motion state.

In a second aspect of the disclosure, a non-transitory computer-readable storage medium is provided. The computer-readable storage medium stores a computer program which, when executed by a processor, is configured to implement the above method.

In a third aspect of the disclosure, an electronic device is provided. The electronic device includes a processor and a memory configured to store one or more programs. The one or more programs, when executed by one or more processors, is operable with the one or more processors to implement the above method.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

BRIEF DESCRIPTION OF THE DRAWINGS

The drawings incorporated in and constituting a part of the specification, illustrate embodiments in accordance with the disclosure and explain the principles of the disclosure together with the description. Apparently, the drawings hereinafter described are merely some embodiments of the disclosure. Based on these drawings, those of ordinary skill in the art can also obtain other drawings without creative effort.

FIG. 6 is a flowchart of a display method in embodiments of the disclosure.

FIG. 7 is a flowchart of a method of replacing a previous image with a target transition animation in embodiments of the disclosure.

FIG. 8 is a flowchart of a method of controlling change of motion special effect animation in embodiments of the disclosure.

FIG. 9 is a flowchart of a method of controlling displacement of motion special effect animation in embodiments of the disclosure.

FIG. 10 is a flowchart of a method of recovering display of a current image in embodiments of the disclosure.

DETAILED DESCRIPTION

Figure 1:
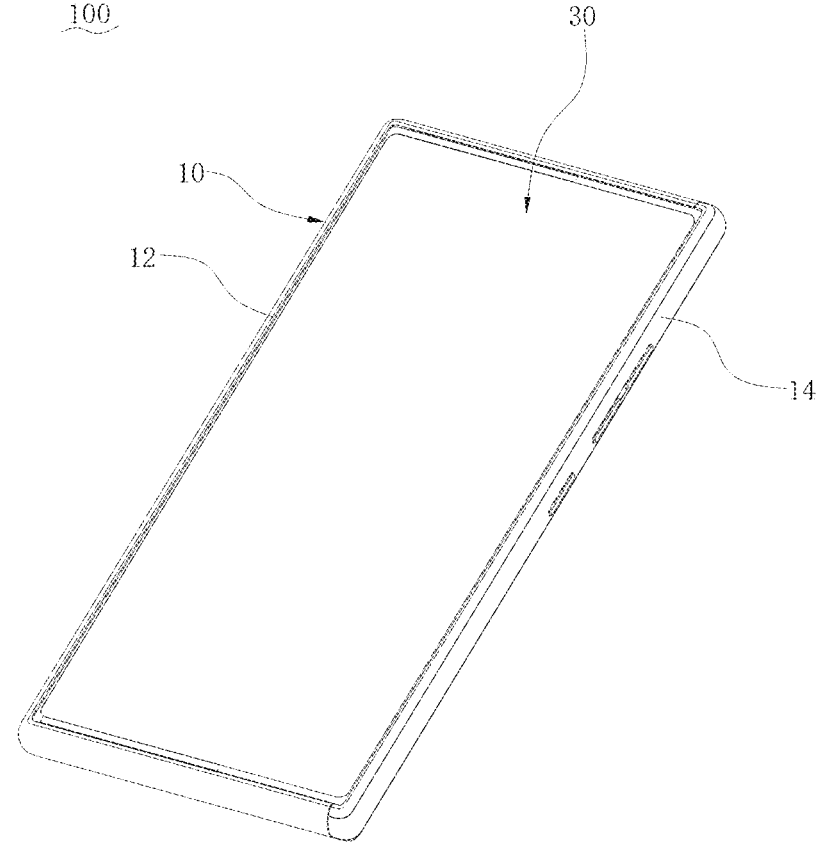
FIG. 1 is a schematic structural diagram of an electronic device in a retracting state that may be applied to embodiments of the disclosure.

Embodiments of the disclosure will be described in more details with reference to the drawings. It should be appreciated that the disclosure can be implemented in various manners and should not be limited to the embodiments explained herein. On the contrary, the embodiments are provided to make the disclosure more thorough and complete and to fully convey the conception of the disclosure to those of skill in the art. The particular feature, structure, or characteristic described may be properly combined in any one or more embodiments.

The drawings are only schematic illustrations of the disclosure and are not necessarily drawn to scale. The same reference signs in the drawings represent identical or similar parts, thus repetitive descriptions thereof will be omitted. Some of the block diagrams shown in the drawings are functional entities that do not necessarily correspond to entities that are physically or logically independent. The functional entities may be implemented in software, or in one or more hardware modules or integrated circuits, or in different networks and/or processor devices and/or microcontroller devices.

An electronic device configured to implement a display method is provided in embodiments of the disclosure. The electronic device may be an electronic device having a retractable screen, such as a smart phone, a tablet computer, etc. The electronic device includes at least a processor and a memory. The memory is configured to store executable instructions of the processor, and the processor is configured to implement a display method by executing the executable instructions.

Taking an electronic device 100 in FIG. 1 to FIG. 5 as an example, the configuration of the electronic device will be illustrated below. Those of skill in the art should understand that the configuration of the electronic device 100 may also be applied to fixed-type devices in addition to devices specifically used for mobile purposes. In other embodiments the electronic device 100 may include more or fewer components than illustrated, or combine certain components, or separate certain components, or may be of different component arrangement. The illustrated components may be implemented in hardware, software, or a combination of software and hardware. The connection between the components is only schematically illustrated and does not constitute any limitation on the structure of the electronic device 100.

Figure 2:
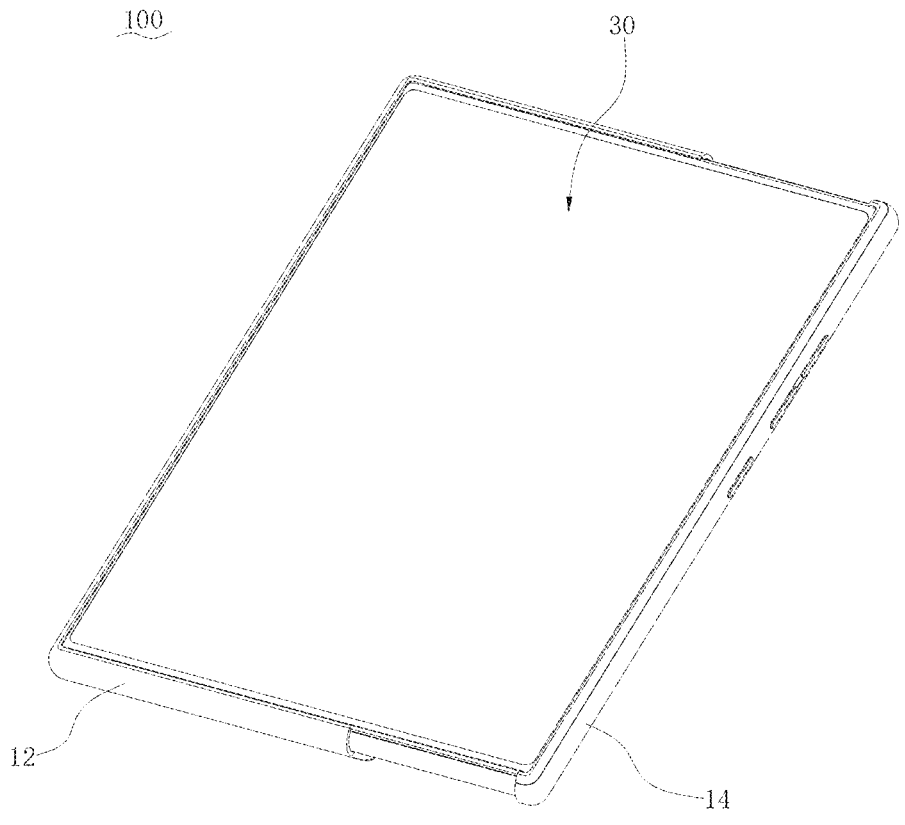
FIG. 2 is a schematic structural diagram of an electronic device in an extending state that may be applied to embodiments of the disclosure.
Figure 3:
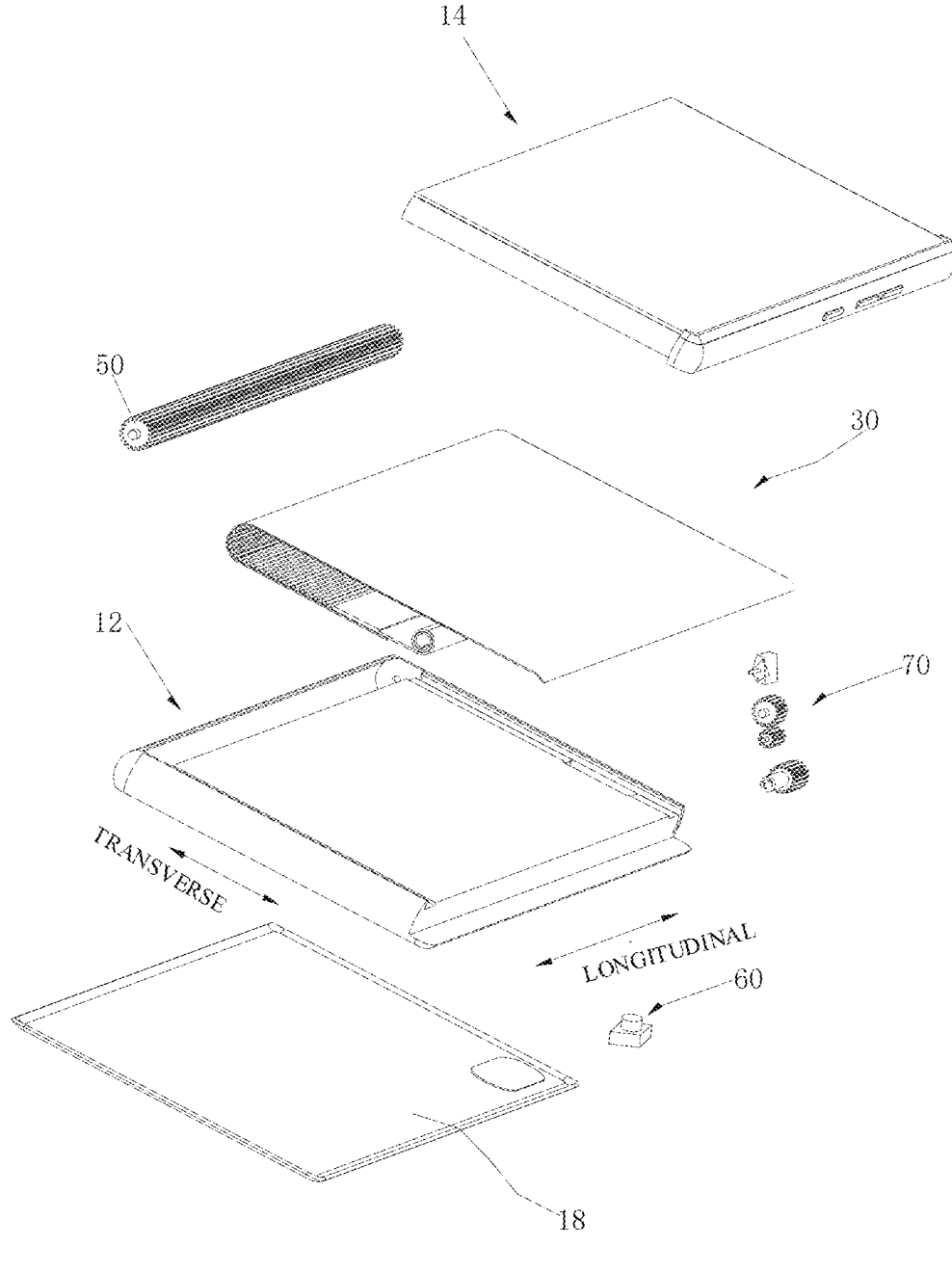
FIG. 3 is an exploded structural view of an electronic device in embodiments of the disclosure.

As illustrated in FIG. 1 to FIG. 3, the electronic device 100 provided in embodiments includes a housing assembly 10, a flexible display screen 30, a driving member 50, and a driving mechanism 70. The housing assembly 10 has a hollow structure, and components such as the driving member 50, the driving mechanism 70, and a camera 90 may be arranged on the housing assembly 10. It is understood that the electronic device 100 provided in embodiments includes but is not limited to mobile terminals such as a mobile phone and a tablet and other portable electronic devices. As an example, the electronic device 100 described herein refers to a mobile phone.

In the embodiment, the housing assembly 10 includes a first housing 12 and a second housing 14, and the first housing 12 and the second housing 14 may move relative to each other. Specifically, in an embodiment, the first housing 12 is slidably connected to the second housing 14, which means the second housing 14 may slide relative to the first housing 12.

Figure 4:
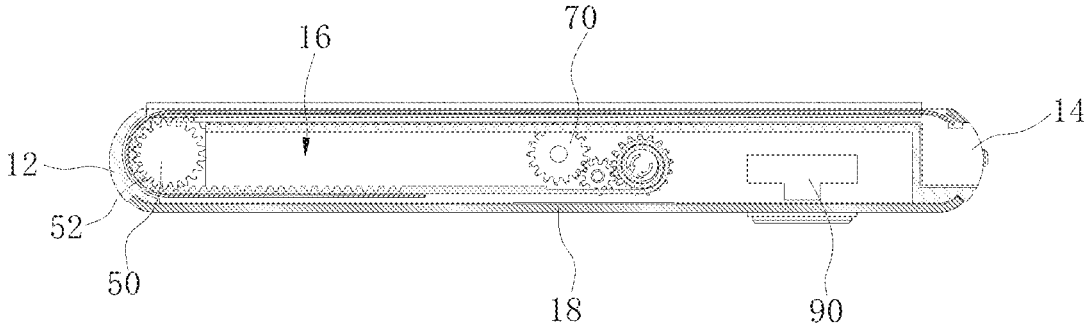
FIG. 4 is a cross-sectional schematic structural diagram of an electronic device in a retracting state in embodiments of the disclosure.
Figure 5:
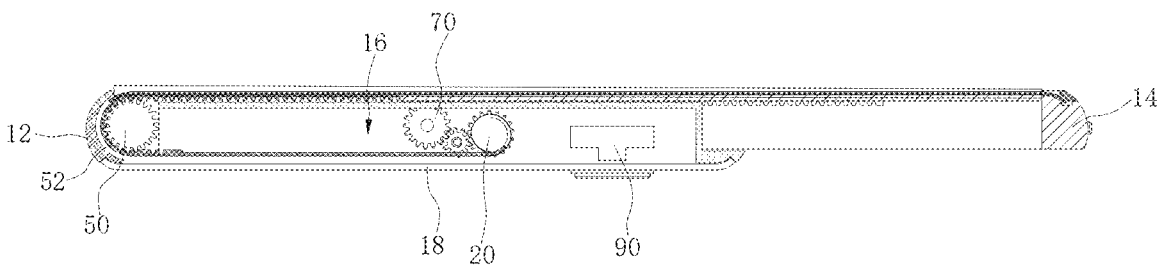
FIG. 5 is a cross-sectional schematic structural diagram of an electronic device in an extending state in embodiments of the disclosure.

Specifically, as illustrated in FIG. 4 and FIG. 5, the first housing 12 and the second housing 14 together define an accommodating space 16. Components such as the driving member 50, the camera 60, and the driving mechanism 70 may be placed in the accommodating space 16. The housing assembly 10 may also include a rear cover 18, the rear cover 18, together with the first housing 12 and the second housings 14, defines the accommodating space 16.

The driving member 50 is arranged on the second housing 14. One end of the flexible display screen 30 is arranged on the first housing 12, the flexible display screen 30 rounds the driving member 50, and the other end of the flexible display screen 30 is arranged in the accommodating space 16, so that part of the flexible display screen 30 is hidden in the accommodating space 16. Said part of the flexible display screen 30 hidden in the accommodating space 16 may not be lit. The first housing 12 and the second housing 14 get relatively far away, and the flexible display screen 30 can be extended under the driving of the driving member 50, so that more parts of the flexible display screen 30 are exposed outside the accommodating space 16. The flexible display screen 30 exposed outside the accommodating space 16 is lit, so that a display region of the electronic device 100 becomes larger.

The driving member 50 may be a rotation shaft structure with teeth 52 on the outside, and the flexible display screen 30 is linked with the driving member 50 by meshing or other manners. When the first housing 12 and the second housing 14 get relatively far away, the driving member 50 drives a part of the flexible display screen 30 meshed on the driving member 50 to move and extend.

It can be understood that the driving member 50 may also be a circular shaft without the teeth 52. When the first housing 12 and the second housing 14 get relatively far away, a part of the flexible display screen 30 rounding on the driving member 50 is extended under the driving of the driving member 50, so that more parts of the flexible display screen 30 are exposed outside the accommodating space 16 and are in a flat state. Specifically, the driving member 50 is rotatably arranged on the second housing 14. When the flexible display screen 30 is gradually extended, the driving member 50 may rotate with the movement of the flexible display screen 30. In other embodiments, the driving member 50 may also be fixed to the second housing 14 and the driving member 50 may have a smooth surface. When the flexible display screen 30 is extended, the driving member 50 is in sliding contact with the flexible display screen 30 through the smooth surface.

When the first housing 12 and the second housing 14 are relatively close, the flexible display screen 30 may be retracted by the driving member 50. Or, the electronic device 100 also includes a reset member (not illustrated). One end of the flexible display screen 30 accommodated in the accommodating space 16 is linked with the reset member. When the first housing 12 and the second housing 14 get relatively close, the reset member drives the flexible display screen 30 to reset, thereby retracting part of the flexible display screen into the accommodating space 16.

In the embodiment, the driving mechanism 70 may be arranged inside the accommodating space 16, and may be linked with the second housing 14. The driving mechanism 70 is configured to drive the second housing 14 to move away from the first housing 12, and then drive the flexible display screen 30 to extend. It can be understood that the driving mechanism 70 may also be omitted. Users may directly move the first housing 12 and the second housing 14 relative to each other manually or the like.

In the related art, one method is to replace a system image or an application interface image displayed on the retractable screen with a static image when the retractable screen is extending or retracting. However, when the retractable screen is extending or retracting, users may pay attention to the change of the retractable screen all the time. If the static image is displayed, the display effect may be simple and less fun, and the user experience may be reduced. Another method is to adjust the system image or application interface image currently displayed on the retractable screen in real time, according to the size of a visible region of the retractable screen when the retractable screen is extending or retracting. However, in this method, if the system image or application interface image displayed in the retractable screen is updated in real time, the calculation amount of the system will be large, and the change of the system image or application interface image may not match the change of expansion or retraction of the retractable screen, rendering the image change unsmooth and affecting the user experience.

Based on one or more problems in the related art, the embodiment of the disclosure first provides a display method that may be applied to the electronic device 100 illustrated in FIG. 1 to FIG. 5, and the display method in embodiments of the disclosure will be described in detail in the following.

FIG. 6 illustrates a flowchart of a display method in the embodiment, including the following operations at S610 to S630.

At S610, a current state of the retractable screen is monitored, where the current state includes a static state and a motion state.

In an embodiment, the current state may refer to a state that the retractable screen is in at a current moment. For example, the retractable screen is in the static state without extending or retracting when the retractable screen needs to display a related image, and the retractable screen is in the motion state with extending motion or retracting motion when the retractable screen needs to be extended or retracted.

The current state of the retractable screen may be determined by monitoring a control instruction for the retractable screen with an established monitoring process. For example, if the monitoring process monitors an extension instruction or a retraction instruction for controlling the retractable screen, the current state of the retractable screen is determined as the motion state, and if the monitoring process monitors a stop instruction or a wait instruction for controlling the retractable screen, the current state of the retractable screen is determined as the static state. The current state of the retractable screen may also be determined by monitoring the operation of the driving member that controls the movement of the retractable screen. For example, if monitoring that the driving member is in a power-on and operating state, the current state of the retractable screen is determined as the motion state, and if monitoring that the driving member is in a power-off or a power-on and not operating state, the current state of the retractable screen is determined as the static state. The current state of the retractable screen may also be monitored in other ways, which is not limited in the embodiment.

At S620, a target transition animation is obtained when detecting that the retractable screen is switched from the static state to the motion state, where the change in the target transition animation corresponds to the motion state.

In an embodiment, the target transition animation refers to an animation that is preset for replacing a displayed system image or an application interface image when the retractable screen is extending or retracting. For example, the target transition animation may be a transition animation that includes a bottom-layer animation and an upper-layer dynamic element, or a transition animation with animation content changing with the motion of the retractable screen, which is not limited in the embodiment.

At S630, a current image displayed on the retractable screen in the static state is replaced with the target transition animation, and the target transition animation is displayed on the retractable screen in the motion state.

In an embodiment, the current image refers to an image displayed in the visible region of the retractable screen in the static state before the retractable screen is switched from the static state to the motion state. For example, the current image may be a lock screen image or an application interface image, which is not limited in the embodiment. When detecting that the retractable screen is switched from the static state to the motion state, since the visible region of the retractable screen in the motion state changes in real time, the size of the visible region of the retractable screen is inconsistent with the size of a displayed image at this time, which may cause poor user experience. Therefore, the currently displayed image may be replaced by a target transition animation corresponding to the change of the retractable screen.

Operations at S610 to S630 are described in detail below.

In an embodiment, the target transition animation may include a bottom-layer animation and a motion special effect animation. The bottom-layer animation may refer to a background animation of the target transition animation, and a main image content of the bottom-layer animation may be some common animation elements. The motion special effect animation may refer to a foreground animation in an upper layer of the bottom-layer animation, and the motion special effect animation may be an animation specially designed to correspond to the motion state of the retractable screen. For example, the image content of the motion special effect animation may be a cartoon character, then the motion special effect animation is a simple animation with a fixed number of frames (such as 4 frames) that can be played repeatedly, and the motion special effect animation may be shown as a cartoon character stepping forward, which is only an example. In a specific implementation, various combinations of the bottom-layer animations and the motion special effect animations are provided to users, which are not limited in the embodiment. In general, the picture size of motion special effect animation may be smaller than the picture size of the bottom-layer animation.

The retractable screen may include a visible region and a hidden region, the visible region is a screen region of the retractable screen outside the accommodating space of the first housing, and the hidden region is a screen region of the retractable screen inside the accommodating space of the first housing.

Specifically, the current image displayed on the retractable screen in the static state may be replaced by the target transition animation through operations in FIG. 7. As illustrated in FIG. 7, the operations include the following. At S710, the bottom-layer animation is displayed in both the visible region and the hidden region to replace the current image displayed on the retractable screen in the static state.

At S720, the motion special effect animation is displayed on an upper layer of the bottom-layer animation.

The bottom-layer animation may be displayed on both the visible region and the hidden region, which is equivalent to covering the whole retractable screen with an animation with the same size as the retractable screen, and the current image displayed on the retractable screen in the static state may be replaced. Moreover, since the bottom-layer animation covers the whole retractable screen, the continuity of the bottom-layer animation may be ensured regardless of a degree to which the screen is expanded, thus improving the continuity of the images displayed on the retractable screen in motion.

After the whole retractable screen is covered with the bottom-layer animation, specially designed motion special effect animation may be displayed on the upper layer of the bottom animation, so that the bottom-layer animation may be used as the background animation of the target transition animation, and the motion special effect animation may be used as the foreground animation of the target transition animation, thus resulting in a distinctive layered target transition animation, enhancing a three-dimensional effect of the target transition animation, and improving an viewing experience.

At the same time, the motion special effect animation included in the target transition animation may be displayed on a boundary between the visible region and the hidden region, so that the motion special effect animation will always be displayed on the boundary during the extending or retracting of the retractable screen. It seems that the retractable screen moves along with the motion special effect animation, which makes the extending and retracting of the retractable screen more interesting.

Specifically, the motion special effect animation may correspond to the motion of the retractable screen through operations in FIG. 8. As illustrated in FIG. 8, the operations include the following. At S810, a moving velocity of the retractable screen in the motion state is obtained. At S820, a playing velocity of the motion special effect animation is controlled according to the moving velocity to make the playing velocity of the motion special effect animation correspond to the moving velocity.

The moving velocity refers to an extending velocity of the retractable screen in an extending process or a retracting velocity of the retractable screen in a retracting process. For example, the moving velocity of the retractable screen may be 20 mm/s. Specifically, the moving velocity of the retractable screen may be determined by detecting a rotational speed of the driving member that drives the retractable screen to move. For example, assuming that the rotational speed of the driving member to be 1000 r/min, the moving velocity of the retractable screen is determined to be 20 mm/s according to a preset velocity-rotational speed mapping relationship, which is only an example and is not limited in the embodiment.

A changing frequency of the motion special effect animation executing a certain animation action may be controlled by changing the playing velocity of the motion special effect animation. For example, if the motion special effect animation is a cartoon character, when the moving velocity of the retractable screen is 20 mm/s, the playing velocity of the motion special effect animation is adjusted to 20 frames/s (assuming that the motion special effect animation is a simple animation that can be played repeatedly and has a length of 4 frames, and the 4 frames of animation show an action of stepping forward of the cartoon character). At this time, the changing frequency of a "stepping action" of legs of the cartoon character shown by the motion special effect animation of 20 frames/s may be 5 times/s. When the moving velocity of the retractable screen increases to 30 mm/s, the playing velocity of the motion special effect animation is adjusted to 40 frames/s. At this time, the changing frequency of the "stepping action" of legs of the cartoon character shown by the motion special effect animation of 40 frames/s may be 10 times/s, which is only an example and is not limited in the embodiment.

Specifically, the motion special effect animation may correspond to the motion of the retractable screen through operations in FIG. 9. As illustrated in FIG. 9, the operations include the following. At S910, displacement data of the retractable screen in the motion state is obtained. At S920, a displacement of the motion special effect animation relative to the bottom-layer animation is controlled according to the displacement data to make a distance between the motion special effect animation and a boundary line between the visible region and the hidden region at any time less than or equal to a preset boundary distance threshold.

The displacement data refers to a moving distance of the retractable screen in the motion state from an initial position to a current position. For example, a point A may be marked at the boundary between the visible region and the hidden region of the retractable screen. A vertical distance between the point A and the boundary between the visible region and the hidden region may be measured during a moving process of the retractable screen, and the vertical distance is the displacement data of the retractable screen.

A boundary distance threshold is used to limit a relative displacement of the motion special effect animation in the bottom-layer animation, so as to ensure that the displacement of the motion special effect animation changes with the motion of the retractable screen. For example, the boundary distance threshold may be 2 cm, 1 cm, and 0 cm. The boundary distance threshold may be customized according to the width of the visible region of the retractable screen of the electronic device, which is not limited in the embodiment.

The distance between the motion special effect animation and the boundary line between the visible region and the hidden region, may be a vertical distance from a center point of the motion special effect animation to the boundary line, and may also be a vertical distance from a left edge or a right edge of the motion special effect animation to the boundary line.

The displacement of the motion special effect animation in the bottom-layer animation can be controlled according to the displacement data of the retractable screen, so that a moving track of the motion special effect animation matches a displacement track of the retractable screen. Then the motion special effect animation may move along with the retractable screen when the retractable screen is moving, and the motion special effect animation is at the boundary between the visible region and the hidden region at any time, thus ensuring the matching between the motion special effect animation and the motion of the retractable screen.

In an embodiment, when the retractable screen ends its motion, the display of the current image on the retractable screen may be restored through operations in FIG. 10. As illustrated in FIG. 10, the operations include the following. At S1010, region area data of the visible region is calculated when detecting that the retractable screen is switched from the motion state to the static state. At S1020, a target resolution ratio is determined according to the region area data, and a current image of the target resolution ratio is generated. At S1030, the target transition animation is replaced with the current image of the target resolution ratio to recover display of the retractable screen in the static state.

The region area data refers to an area and a pixel size corresponding to the visible region of the retractable screen. A pre-stored mapping relationship between region area data and resolution ratios may be obtained, and then the target resolution ratio corresponding to the current visible region may be calculated according to the region area data of the visible region.

After the target resolution ratio is obtained, the current image of an original resolution ratio is transformed to obtain the current image of the target resolution ratio, and then the target transition animation can be replaced by the current image of the target resolution ratio, so that the restored current image adapts to the resolution ratio of the current visible region, which may improve the matching of the restored current image, avoid abnormal display, and improve the user experience.

In another embodiment, in order to further reduce the calculation amount of the system and reduce the system load, the current image can be replaced by a target transition animation that does not include the bottom-layer animation and the motion special effect animation, that is, the target transition animation is not divided into different layers, and the current image may be replaced by a common animation. The target transition animation in the extending state corresponding to the extending motion of the retractable screen and the target transition animation in the retracting state corresponding to the retracting motion of the retractable screen may be set in advance.

Specifically, an extension degree of the retractable screen may be determined first, and then a corresponding playing time-point of the target transition animation may be determined according to the extension degree of the retractable screen, and then the current image displayed on the retractable screen in the static state may be replaced by the target transition animation at the playing time-point, where the playing velocity of the target transition animation matches the moving velocity of the retractable screen in the motion state.

The extension degree refers to a proportion of the visible region to the whole retractable screen. For example, if the proportion of the visible region to the whole retractable screen is 50%, it can be considered that the extension degree of the retractable screen is 50%. Assuming that time required for a fully retracted retractable screen to fully extend is 10 s, a target transition animation corresponding to the extending motion with a duration of 10 s and a target transition animation corresponding to the retracting motion with a duration of 10 s may be set in advance. When the extension degree of the retractable screen is determined to be 50%, it can be considered that half of the retractable screen is expanded, and time spent is 5 s, so that the playing time-point of the target transition animation corresponding to the extending motion or the target transition animation corresponding to the retracting motion can be directly set at 5 s. When the target transition animation is displayed on the retractable screen, the animation content of the target transition animation corresponds to the visible region with the extension degree of 50%, thus ensuring the matching between the target transition animation and the visible region of the moving retractable screen and improving the smoothness of image display.

Specifically, the current visible region and the current hidden region of the retractable screen may be determined, and then the extension degree of the retractable screen may be calculated according to the areas of the current visible region and the current hidden region. For example, the extension degree of the retractable screen can be calculated according to the areas of the current visible region and the current hidden region according to an equation (1):

$$k = \frac{s_1}{s_1 + s_2} * 100\% \qquad (1)$$

In the relation (1), k may represent the extension degree of the retractable screen, S1 may represent the area of the current visible region, and S2 may represent the area of the current hidden region.

Figure 11:
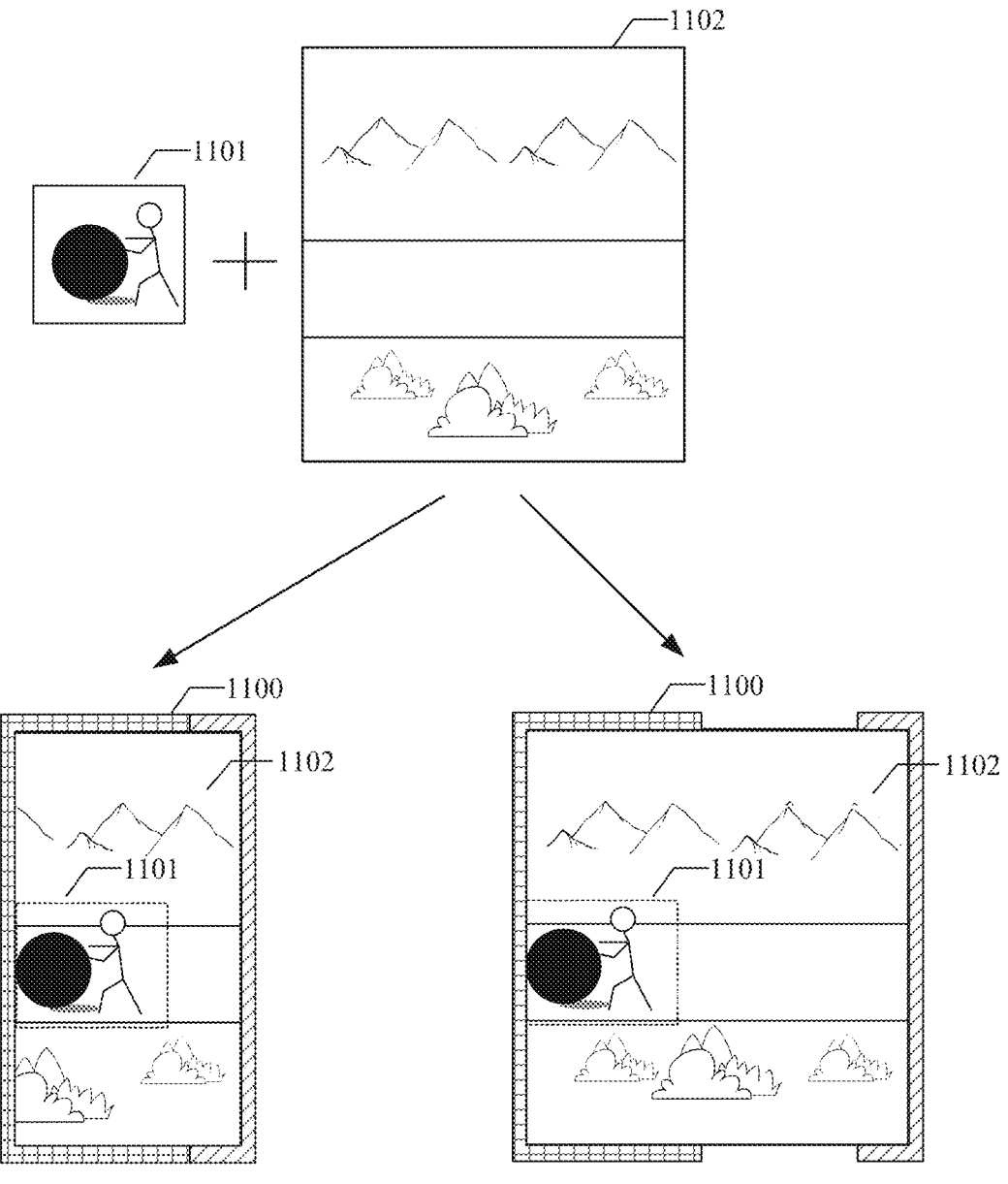
FIG. 11 is a schematic diagram of a target transition animation corresponding to extending motion in embodiments of the disclosure.

FIG. 11 a schematic diagram of a target transition animation corresponding to extending motion in embodiments of the disclosure. As illustrated in FIG. 11, the retractable screen of the electronic device 1100 may be switched from a static state to a motion state (for example, switched from a static state to extending motion), and the current image displayed on the retractable screen in the static state may be a system interface image such as a lock screen image or an application interface image, etc. During the extension of the retractable screen, adjusting the size of the system interface image or the application interface image in real time will lead to large system computation, so the current image may be replaced by a target transition animation to reduce the system computation and improve the matching of the displayed image.

For example, the target transition animation may be composed of a motion special effect animation 1101 (only one motion special effect animation is schematically illustrated in FIG. 11, and it is easy to understand that there may be multiple motion special effect animations 1101, which may be specifically determined according to information such as animation content or animation size of the motion effect animation, which is not limited in the embodiment) and a bottom-layer animation 1102. In FIG. 11, since the motion of the retractable screen is extending motion, the bottom-layer animation 1102 may be set as a picture scroll, and the motion special effect animation 1101 may be set as a "match man" pushing a sphere (i.e., when the retractable screen is extending, a job or task may need to be carried out, and the mood of the user is matched by showing the "match man" pushing the sphere "bearing" forward, and the user experience is improved. The motion special effect animation 1101 may also have a variety of designed animation contents, which is not limited in the embodiment). With the motion of the retractable screen of the electronic device 1100, the playing velocity of the motion special effect animation 1101 and the position of the motion special effect animation 1101 in the bottom-layer animation 1102 also correspond to the moving velocity and the displacement of the retractable screen. By showing the "match man" pushing the retractable screen to extend in the motion special effect animation 1201, the target transition animation is more interesting, and the animation content of the target transition animation may correspond to the movement of the retractable screen, which improves the matching between the target transition animation and the retractable screen and improves the user experience.

Figure 12:
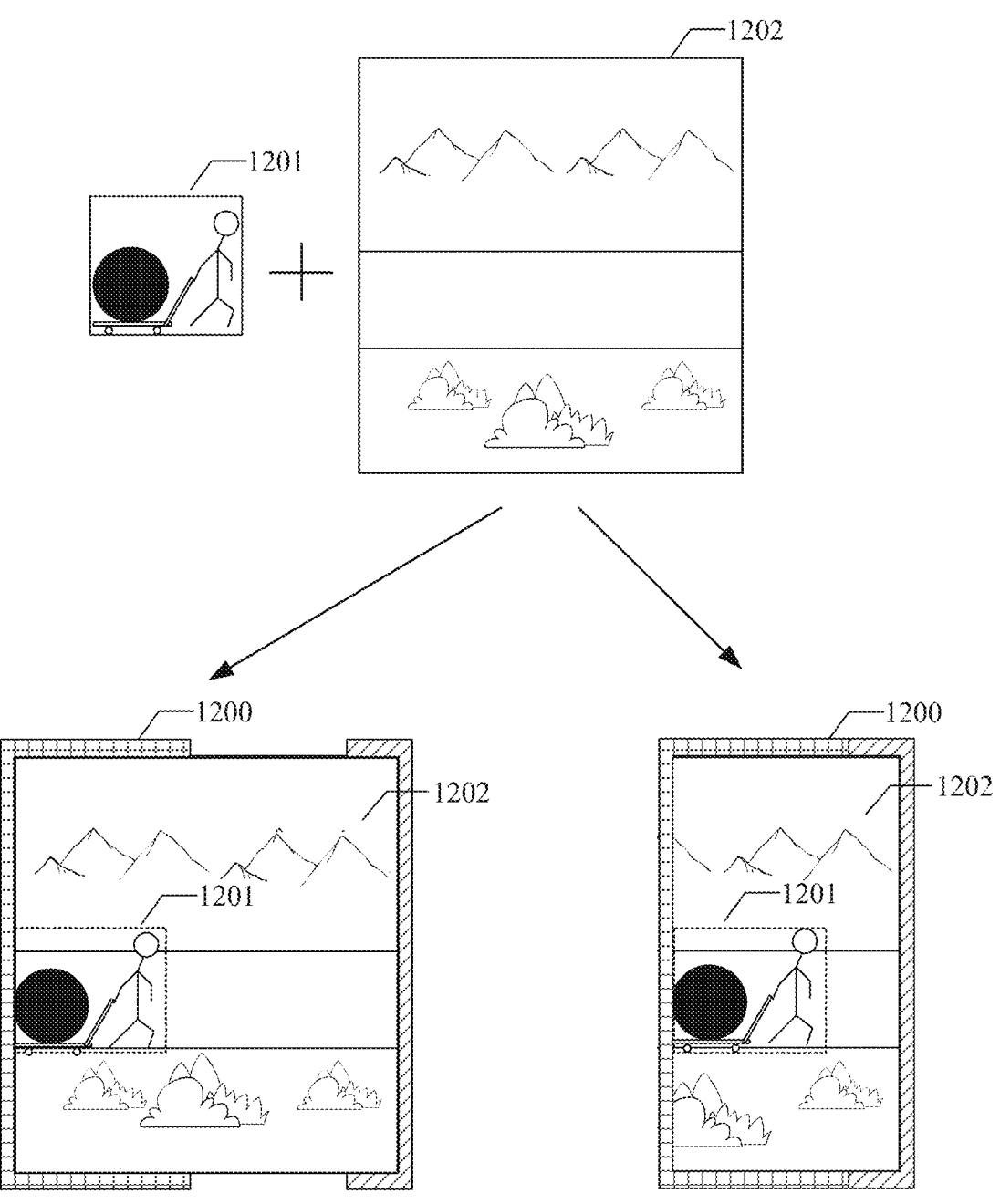
FIG. 12 is a schematic diagram of a target transition animation corresponding to retracting motion illustrated in embodiments of the disclosure.

FIG. 12 is a schematic diagram of a target transition animation corresponding to retracting motion in embodiments of the disclosure. As illustrated in FIG. 12, the retractable screen of the electronic device 1200 may be switched from the static state to the motion state (e.g., switched from the static state to retracting motion), and the current image displayed on the retractable screen in the static state may be a system interface image such as a lock screen image or an application interface image, etc. During the extension of the retractable screen, adjusting the size of the system interface image or the application interface image in real time will lead to large system computation. Therefore, the current image may be replaced by the target transition animation to reduce the computation of the system and improve the matching between the displayed image and the retractable screen.

For example, the target transition animation may be composed of a motion special effect animation 1201 and a bottom-layer animation 1202. In FIG. 12, since the motion of the retractable screen is retracting motion, the bottom-layer animation 1202 may be set as an extended picture scroll, and the motion special effect animation 1201 may be set as a "match man" pulling a sphere with a trolley (i.e., when the retractable screen is retracting, a job or task may be accomplished, and the mood of the user is matched by showing the "match man" pulling the sphere forward with a trolley "relaxingly", and the user experience is improved. The motion special effect animation 1101 may also have a variety of designed animation contents, which is not limited in the embodiment). With the motion of the retractable screen of the electronic device 1200, the motion special effect animation 1201 also corresponds to the moving velocity and the displacement data of the retractable screen. By showing the "match man" pulling the retractable screen to retract in the motion special effect animation 1201, the target transition animation is more interesting, and the animation content of the target transition animation may correspond to the movement of the retractable screen, which improves the matching between the target transition animation and the retractable screen and improves the user experience.

Figure 13:
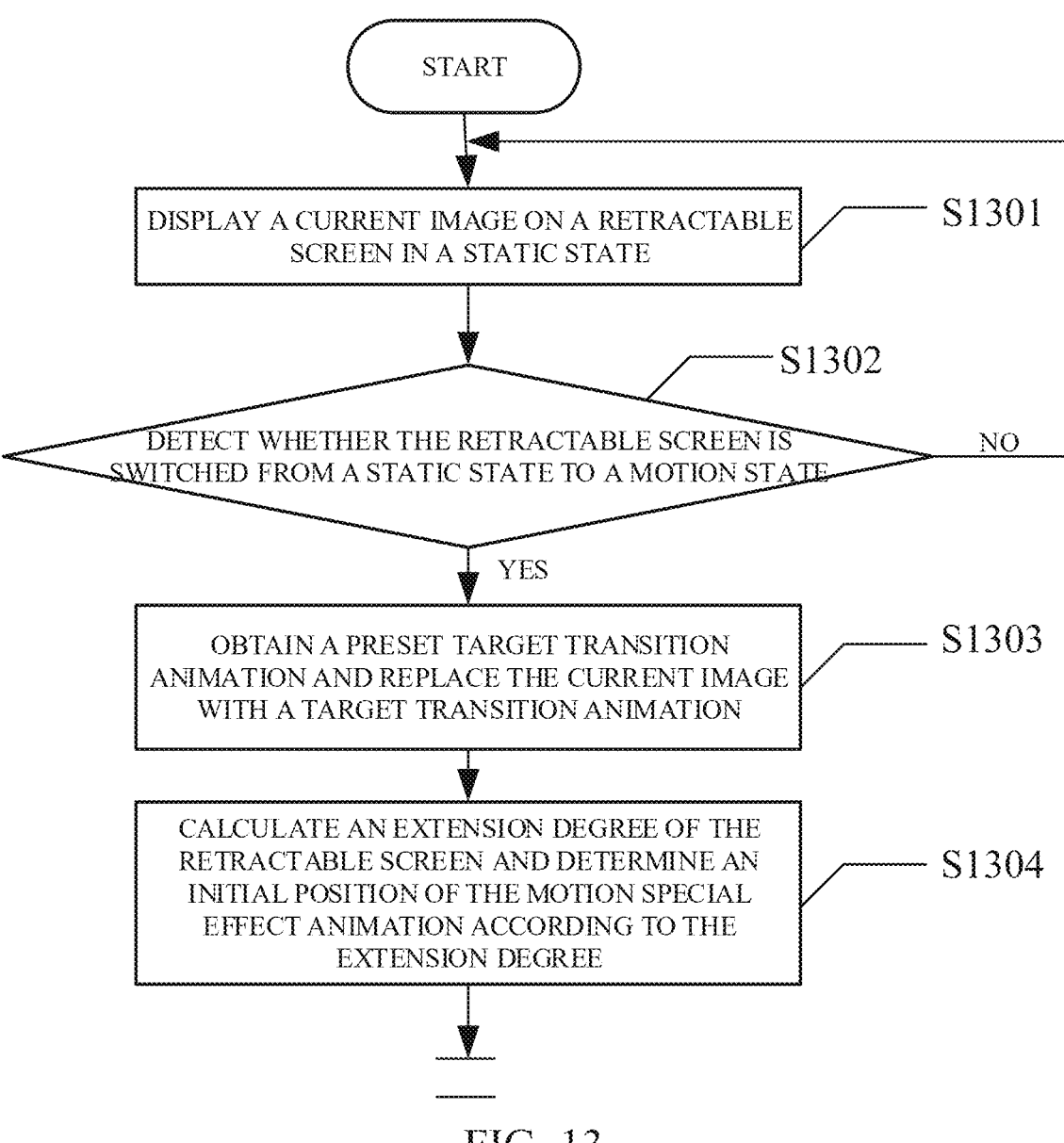
FIG. 13 is a flowchart of a method of displaying a target transition animation in embodiments of the disclosure.
Figure 13:
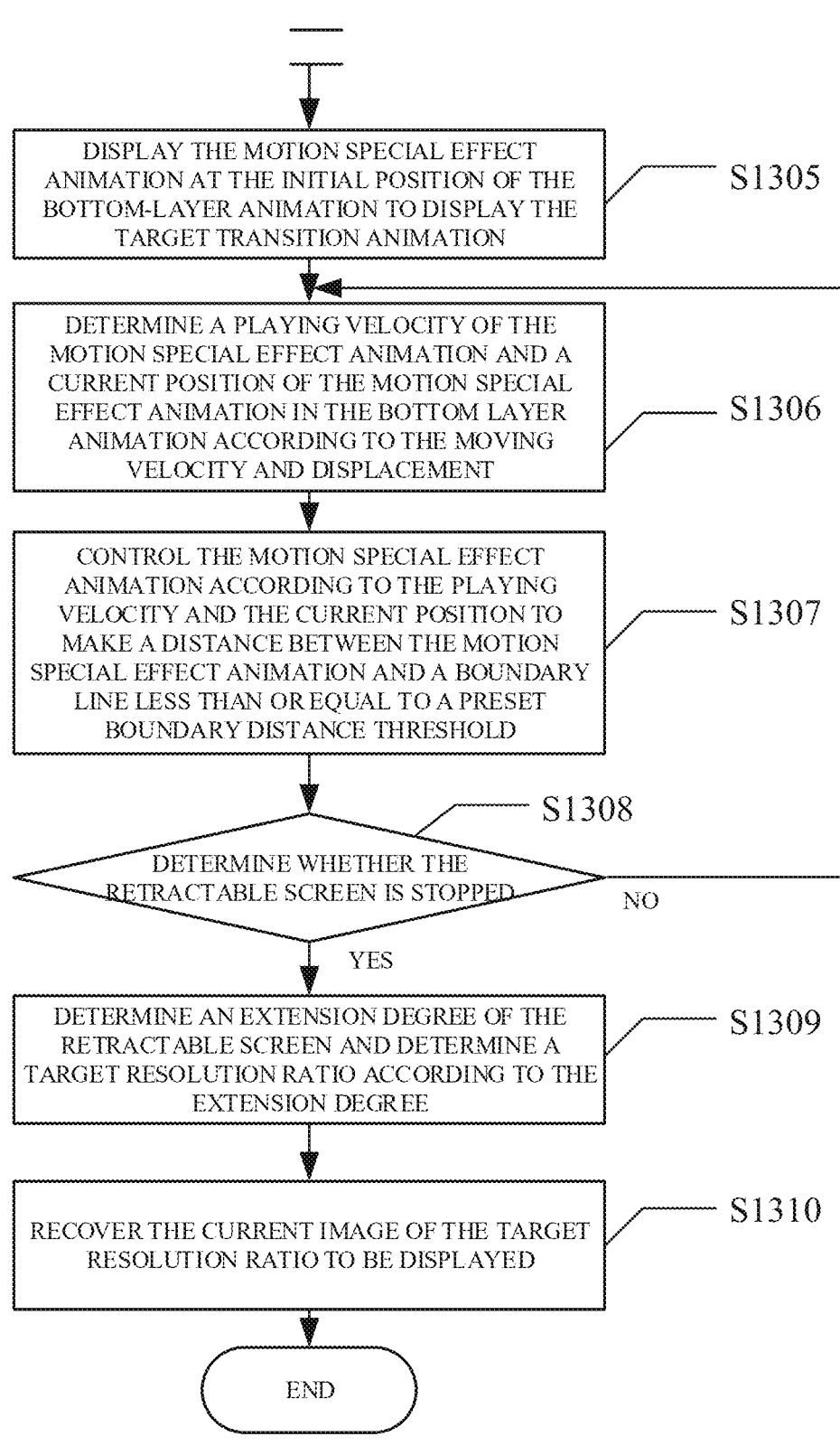

FIG. 13 is a flowchart of a method of displaying a target transition animation in embodiments of the disclosure.

Reference is made to FIG. 13. At S1301, a current image is displayed on a retractable screen in a static state. At S1302, whether the retractable screen is switched from a static state to a motion state is detected. If yes, proceed to operations at S1303, otherwise return to execute operations at S1301. At S1303, a preset target transition animation is obtained and the current image is replaced with a target transition animation, where the target transition animation may include a motion special effect animation and a bottom-layer animation. At S1304, an extension degree of the retractable screen is calculated and an initial positon of the motion special effect animation in the bottom-layer animation is determined according to the extension degree. At S1305, the motion special effect animation is displayed at the initial position of the bottom-layer animation to display the target transition animation, and the target transition animation is made to correspond to the extension degree of the retractable screen. At S1306, a playing velocity of the motion special effect animation and a current position of the motion special effect animation in the bottom-layer animation are determined according to the moving velocity and displacement data of the retractable screen. At S1307, the motion special effect animation is controlled according to the playing velocity and the current positon to make a distance between the motion special effect animation and a boundary line between a visible region and a hidden region less than or equal to a preset boundary distance threshold at any time. At S1308, whether the retractable screen is stopped is determined, if yes, proceed to operations S1309, otherwise return to execute operations at S1306. At S1309, an extension degree of the retractable screen when the retractable screen is stopped is determined, and a target resolution ratio is determined according to the extension degree. At S1310, the current image of the target resolution ratio is recovered to be displayed.

Figure 14:
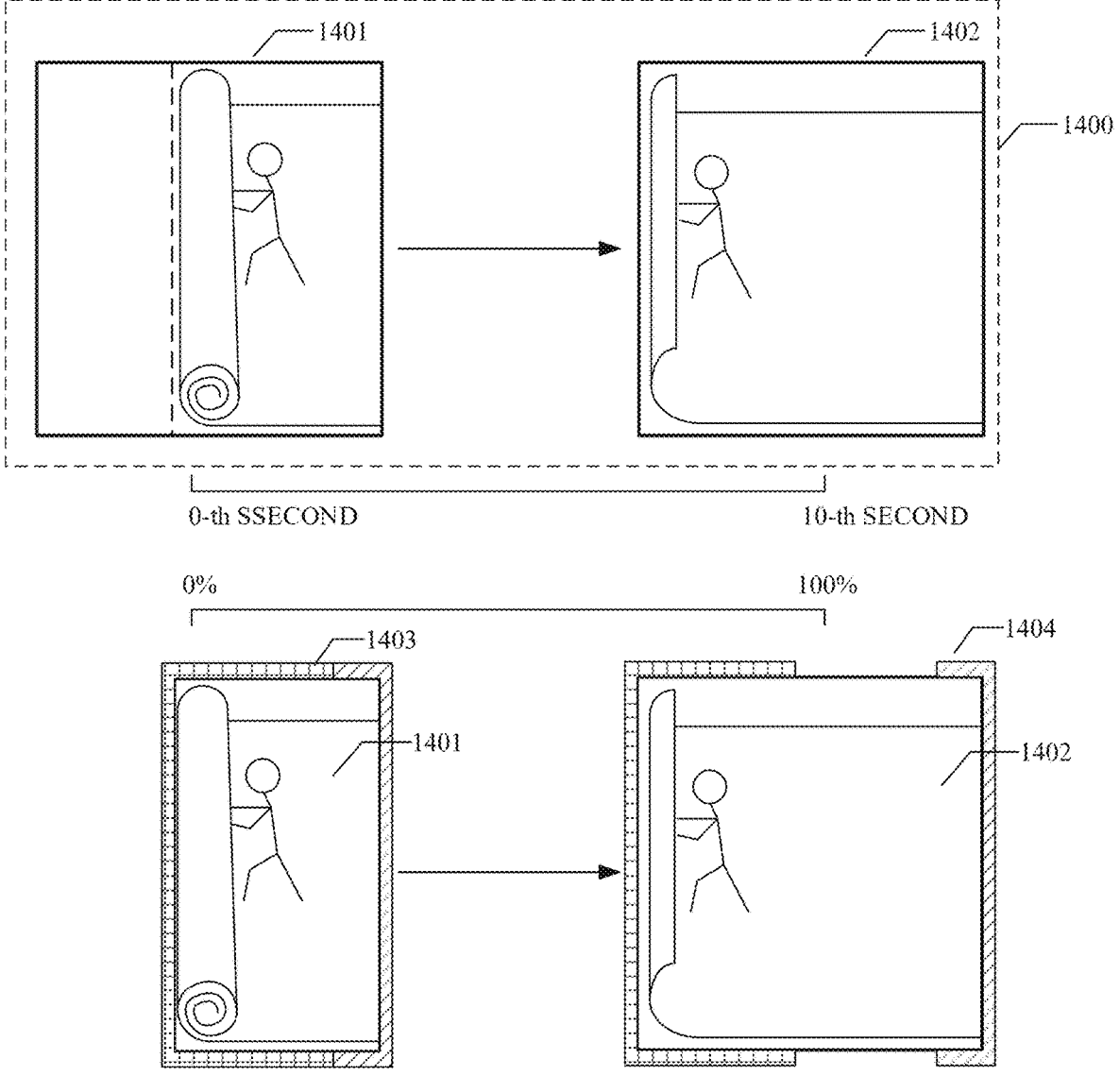
FIG. 14 is a schematic diagram of another target transition animation corresponding to extending motion in embodiments of the disclosure.

FIG. 14 is a schematic diagram of another target transition animation corresponding to extending motion in embodiments of the disclosure. As illustrated in FIG. 14, the target transition animation in the embodiment may be a common animation, which is not a layered animation consisting of a motion special effect animation and a bottom-layer animation. A target transition animation corresponding to the extension or retraction of the retractable screen may be designed in advance.

In FIG. 14, the motion of the retractable screen of the electronic device may be extending motion, then a target transition animation 1400 corresponding to the extending motion may be designed. For example, the target transition animation 1400 may be designed as a cartoon character pushing a picture scroll or a carpet extending.

Assuming that the target transition animation 1400 is an animation with a playing length of 10 s, in which an animation frame corresponding to 0 s may be 1401, an animation frame corresponding to 10 s may be 1402, and other frames between the animation frame 1401 and the animation frame 1402 are contents changed from the animation frame 1401 to the animation frame 1402. Then the animation frame 1401 matches a visible region 1403 when an extension degree of the retractable screen is 0%, and the animation frame 1402 matches a visible region 1404 when the extension degree of the retractable screen is 100% (it is easy for those of skill in the related art to understand that only a matching relationship between 0 s and 0% and a matching relationship between 10 s and 100% are illustrated in the figure, and matching relations between other animation frames and extension degrees are continuously corresponded between 0 s-10 s and 0%-100%, which is omitted here). As such, the target transition animation 1400 and the extending motion of the retractable screen is matched at all times. For example, when the extension degree of the retractable screen is 50%, a matched animation frame should be an animation frame of the target transition animation 1400 at a playing time-point of 5 s. Therefore, when the extension degree of the retractable screen is detected to be 50%, the target transition animation 1400 is directly jumped to the playing time-point of 5 s for playing.

Figure 15:
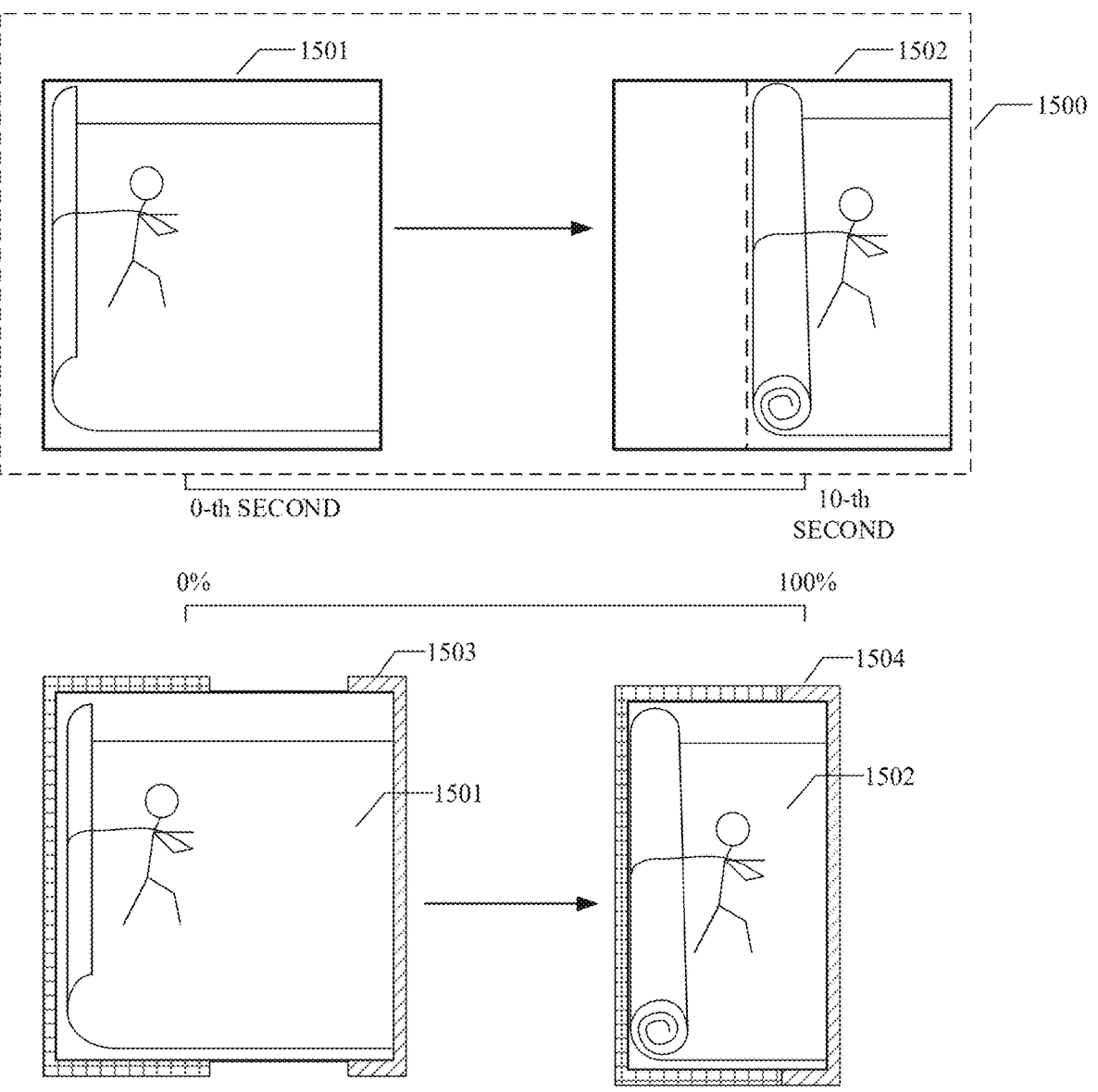
FIG. 15 is a schematic diagram of another target transition animation corresponding to retracting motion in embodiments of the disclosure.

FIG. 15 is a schematic diagram of another target transition animation corresponding to retracting motion in embodiments of the disclosure.

As illustrated FIG. 15, the target transition animation in the embodiment may be a common animation, which is not a layered animation consisting of a motion special effect animation and a bottom-layer animation. A target transition animation corresponding to the extension or retraction of the retractable screen may be designed in advance.

In FIG. 15, the motion of the retractable screen of the electronic device may be retracting motion, then a target transition animation 1500 corresponding to the retracting motion may be designed. For example, the target transition animation 1500 may be designed as a cartoon character pulling a picture scroll with a string or a carpet rolling up.

Assuming that the target transition animation 1500 is an animation with a playing length of 10 s, in which an animation frame corresponding to 0 s may be 1501, an animation frame corresponding to 10 s may be 1502, and other time frames between the animation frame 1501 and the animation frame 1502 are the contents changed from the animation frame 1501 to the animation frame 1502. Then the animation frame 1501 matches a visible region 1503 when an extension degree of the retractable screen in the retracting motion is 0%, and the animation frame 1502 matches a visible region 1504 when the extension degree of the retractable screen in the retracting motion is 100% (it is easy for those of skill in the art to understand that only a matching relationship between 0 s and 0% and a matching relationship between 10 s and 100% are illustrated in the figure, and the matching relations between other animation frames and extension degrees are continuously corresponded between 0 s to 10 s and 0% to 100%, which is omitted here). As such, the target transition animation 1500 and the retracting motion of the retractable screen is matched at all times. For example, when the extension degree of the retractable screen is 50%, a matched animation frame should be an animation frame of the target transition animation 1500 at the playing time-point of 5 s. Therefore, when the extension degree of the retractable screen is detected to be 50%, the target transition animation 1500 is directly jumped to the playing time-point of 5 s for playing.

To sum up, in the embodiment, the current state of the retractable screen may be monitored, and the current state includes the static state and the motion state. If detecting that the retractable screen is switched from the static state to the motion state, the target transition animation is obtained, and the change of the target transition animation corresponds to the motion state. By replacing the current image displayed on the retractable screen in the static state with the target transition animation, the target transition animation may display on the moving retractable screen. On one hand, by replacing the current image with the target transition animation, the target transition animation corresponding to the motion of the retractable screen is displayed, so that the matching between the displayed image and the visible region of the retractable screen is improved, and the target transition animation is more interesting than the static image; on the other hand, the current image is replaced by the target transition animation, so that the size of the current image does not need to be adjusted in real time during the moving retractable screen, thus reducing the computation of the system, improving the system performance, ensuring the fluency of the image displayed on the moving retractable screen, and improving the user experience.

It should be noted that, the above drawings are only illustration of the processes included in the method of the embodiments of the disclosure, and shall not constitute any limitation to the embodiments. It is readily understood that the processes illustrated in the above drawings do not indicate or limit any temporal order of these processes. In addition, it is also readily understood that these processes may be performed synchronously or asynchronously in multiple modules.

Figure 16:
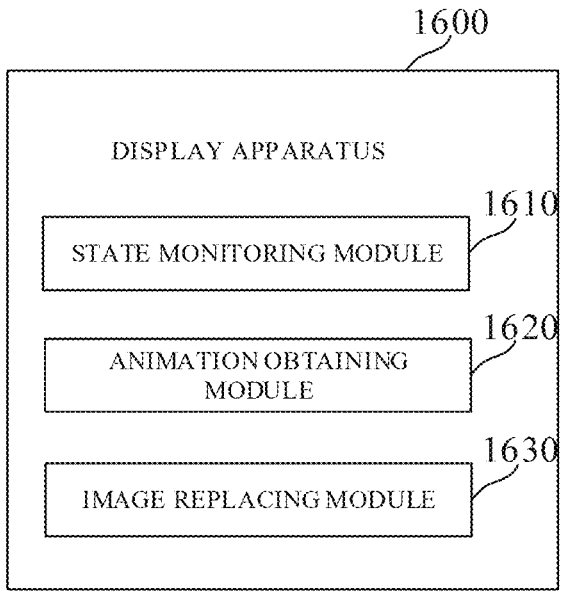
FIG. 16 is a schematic composition diagram of a display apparatus in embodiments of the disclosure.

Further, as illustrated in FIG. 16, a display apparatus 1600 is also provided in embodiments of the disclosure. The display apparatus 1600 may include a state monitoring module 1610, an animation obtaining module 1620, and an image replacing module 1630. The state monitoring module 1610 is configured to monitor a current state of a retractable screen, where the current state includes a static state and a motion state. The animation obtaining module is configured to obtain a target transition animation in response to detecting that the retractable screen is switched from the static state to the motion state, where a change in the target transition animation corresponds to the motion state. The image replacing module is configured to replace the current image displayed on the retractable screen in the static state with the target transition animation.

In an embodiment, the target transition animation may include a bottom-layer animation and a motion special effect animation, and the retractable screen may have a visible region and a hidden region. The image replacing module 1630 may be configured to display the bottom-layer animation in both the visible region and the hidden region, to replace the current image displayed on the retractable screen in the static state; and display the motion special effect animation on an upper layer of the bottom-layer animation.

In an embodiment, the display apparatus 1600 may further include a changing frequency determining unit, and the changing frequency determining unit may be configured to obtain a moving velocity of the retractable screen in the motion state; and control a playing velocity of the motion special effect animation according to the moving speed to make the playing velocity of the motion special effect animation correspond to the moving velocity.

In an embodiment, the display apparatus 1600 may further include a displacement controlling unit, and the displacement controlling unit may be configured to obtain displacement data of the retractable screen in the motion state; and control a displacement of the motion special effect animation relative to the bottom-layer animation according to the displacement data, to make the distance between the motion special effect animation and the boundary line between the visible region and the hidden region less than or equal to the preset boundary distance threshold at any time.

In an embodiment, the display apparatus 1600 may further include an image recovering unit, and the image recovering unit may be configured to calculate region area data of the visible region when detecting that the retractable screen is switched from the motion state to the static state; determine a target resolution ratio according to the region area data, and generate a current image of the target resolution ratio; and replace the target transition animation with the current image of the target resolution ratio to recover display of the retractable screen in the static state.

In an embodiment, the image replacing module 1630 may further include an extension degree determining unit and a current image replacing unit. The extension degree determining unit is configured to determine an extension degree of the retractable screen. The current image replacing unit is configured to determine a corresponding playing time-point of the target transition animation according to the extension degree, and replace the current image displayed on the retractable screen in the static state with the target transition animation at the playing time-point, where the playing velocity of the target transition animation corresponds to the moving velocity of the retractable screen in the motion state.

In an embodiment, the extension degree determining unit may also be configured to determine a current visible region and a current hidden region of the retractable screen, and calculate the extension degree of the retractable screen according to the area of the current visible region and the area of the current hidden region.

The specific details of each module in the above apparatus are described in detail in method embodiments, and undisclosed details may be referred to method embodiments, which will not be repeated here.

Those of skill in the art may understand that various aspects of the disclosure can be implemented as a method, a system, or a computer program product. Therefore, various aspects of the disclosure may be implemented in the following forms: hardware-only implementations, software-only implementations (including firmware or micro-code, etc.), or implementations combining software and hardware, all of which may be referred to as "circuit", "module", or "system".

Figure 17:
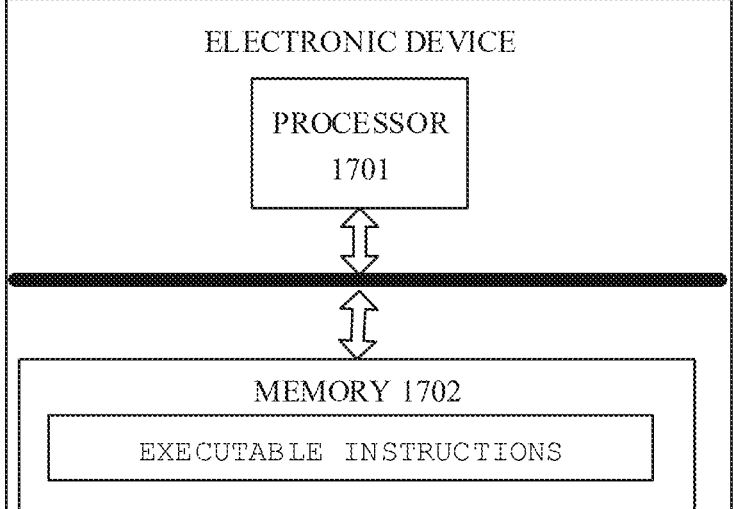
FIG. 17 is a schematic block diagram of an electronic device in embodiments of the disclosure.

As illustrated in FIG. 17, an electronic device configured to implement a display method is provided in embodiments of the disclosure. The electronic device may be an electronic device having a retractable screen, such as a smart phone, a tablet computer, etc. The electronic device includes at least a processor 1701 and a memory 1702. The memory 1702 is configured to store executable instructions of the processor 1701, and the processor 1701 is configured to implement operations according to various embodiments of the disclosure described in method embodiments of the specification, such as any one or more of operations in FIG. 6 to FIG. 15.

A non-transitory computer-readable storage medium is further provided in the embodiment, and the non-transitory computer-readable storage medium stores a program product capable of implementing the method described herein. In some possible embodiments, various aspects of the disclosure may also be implemented in a form of a program product. The program product includes program codes which, when executed on a terminal device, enables the terminal device to implement the operations according to various embodiments of the disclosure described in method embodiments of the specification, such as any one or more of operations in FIG. 6 to FIG. 15.

It should be noted that the computer-readable storage medium provided in the disclosure may be a computer-readable signal medium, or a computer-readable storage medium, or any combination of the above. The computer-readable storage medium may be but is not limited to, for example, electrical, magnetic, optical, electromagnetic, infrared, or semiconductor systems, devices, or any combination of the above. The computer-readable storage medium may specifically include but is not limited to a portable disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination thereof.

In the disclosure, a computer-readable storage medium may be any tangible medium containing or storing a program that may be used by or in conjunction with an instruction execution system, apparatus, or device. In the disclosure, the computer-readable signal medium may include a data signal transmitted in the baseband or as part of a carrier wave, in which a computer-readable program code is carried. Such transmitted data signals may take a variety of forms including but not limited to electromagnetic signals, optical signals or any suitable combination thereof. The computer-readable signal medium may also be any computer-readable medium other than a computer-readable storage medium, and said computer-readable medium may send, broadcast, or transmit a program used for or in conjunction with an instruction execution system, apparatus, or device. The program code contained in the computer-readable storage medium may be transmitted using any suitable medium including but not limited to wireless transmission, wire, optical cable, radio frequency (RF) etc., or any suitable combination thereof.

The program codes used to execute the disclosure can be programmed through any combinations of one or more types of program design languages, such as Java, C++, or conventional procedural program design languages such as the "C" language or similar program design languages. The program codes can be executed completely or partially on a user computing device, executed as a separate software packet, executed partially on the user computing device and partially on a remote device, or executed completely on the remote device. In the case of a remote device, the remote device may be connected to a user computing device through any kind of network, including a local area network (LAN) or a wide area network (WAN), or may be connected to an external computing device (e.g. via the internet using an internet service provider).

After considering the specification and practicing the disclosure disclosed herein, other embodiments of the disclosure may readily occur to those of skill in the art. The disclosure is intended to cover any variations, applications or adaptions of the disclosure, and these variations, applications or adaptions follow the general principles of the disclosure and include common sense or conventional technical means in the art not disclosed in the disclosure. The specification and embodiments are merely considered to be exemplary, and a true scope and spirit of the disclosure are defined by the appended claims.

It should be understood that the disclosure is not limited to the precise structure described above and illustrated in the drawings, and various modifications and changes may be made within the scope. The scope of protection of the disclosure should be limited only by the appended claims.

What is claimed is:

1. A display method, performed by an electronic device having a retractable screen, the method comprising:

monitoring a current state of the retractable screen, wherein the current state comprises a static state and a motion state;

obtaining a target transition animation in response to detecting that the retractable screen is switched from the static state to the motion state, wherein a change in the target transition animation corresponds to the motion state; and replacing a current image displayed on the retractable screen in the static state with the target transition animation, and displaying the target transition animation on the retractable screen in the motion state;

wherein the target transition animation comprises a bottom-layer animation and a motion special effect animation, the retractable screen has a visible region and a hidden region;

wherein the method further comprises:

obtaining displacement data of the retractable screen in the motion state; and controlling a displacement of the motion special effect animation relative to the bottom-layer animation according to the displacement data, to make a distance between the motion special effect animation and a boundary line between the visible region and the hidden region less than or equal to a boundary distance threshold at any time.

2. The method of claim 1, wherein replacing the current image displayed on the retractable screen in the static state with the target transition animation comprises:

displaying the bottom-layer animation in both the visible region and the hidden region to replace the current image displayed on the retractable screen in the static state; and displaying the motion special effect animation on an upper layer of the bottom-layer animation.

3. The method of claim 1, further comprising:

obtaining a moving velocity of the retractable screen in the motion state; and controlling a playing velocity of the motion special effect animation according to the moving velocity to make the playing velocity of the motion special effect animation correspond to the moving velocity.

4. The method of claim 3, wherein the motion special effect animation comprises an animation movement, and controlling the playing velocity of the motion special effect animation according to the moving velocity comprises:

controlling a changing frequency of the animation movement according to the moving velocity.

5. The method of claim 1, wherein the distance between the motion special effect animation and the boundary line between the visible region and the hidden region is a vertical distance from a center point of the motion special effect animation to the boundary line.

6. The method of claim 1, wherein the distance between the motion special effect animation and the boundary line between the visible region and the hidden region is a vertical distance from a left edge or a right edge of the motion special effect animation to the boundary line.

7. The method of claim 1, wherein the motion special effect animation has a screen size smaller than the bottom-layer animation.

8. The method of claim 1, wherein the bottom-layer animation serves as a background animation of the target transition animation, and the motion special effect animation serves as a foreground animation of the target transition animation.

9. The method of claim 1, wherein the electronic device comprises a first housing, the visible region is a screen region of the retractable screen outside an accommodating space of the first housing, and the hidden region is a screen region of the retractable screen inside the accommodating space of the first housing.

10. The method of claim 1, further comprising:

calculating region area data of the visible region in response to detecting that the retractable screen is switched from the motion state to the static state;

determining a target resolution ratio according to the region area data, and generating a current image of the target resolution ratio; and replacing the target transition animation with the current image of the target resolution ratio to recover display of the retractable screen in the static state.

11. The method of claim 10, wherein determining the target resolution ratio according to the region area data comprises:

obtaining a mapping relationship between region area data and image resolution ratios; and determining the target resolution ratio according to the mapping relationship and the region area data of the visible region.

12. The method of claim 1, wherein replacing the current image displayed on the retractable screen in the static state with the target transition animation comprises:

determining an extension degree of the retractable screen;

determining a corresponding playing time-point of the target transition animation according to the extension degree; and replacing the current image displayed on the retractable screen in the static state with the target transition animation at the playing time-point, wherein a playing velocity of the target transition animation corresponds to a moving velocity of the retractable screen in the motion state.

13. The method of claim 12, wherein determining the extension degree of the retractable screen comprises:

determining a current visible region and a current hidden region of the retractable screen; and calculating the extension degree according to an area of the current visible region and an area of the current hidden region.

14. The method of claim 1, wherein monitoring the current state of the retractable screen comprises:

establishing a monitoring process; and monitoring, by means of the monitoring process, a control instruction for the retractable screen, and determining the current state of the retractable screen according to the control instruction.

15. The method of claim 14, wherein determining the current state of the retractable screen according to the control instruction comprises:

determining the current state of the retractable screen as the motion state in response to monitoring an extension instruction or a retraction instruction used for controlling the retractable screen; or determining the current state of the retractable screen as the static state in response to monitoring a stop instruction or a wait instruction used for controlling the retractable screen.

16. The method of claim 1, wherein the electronic device comprises a driving member configured to control the retractable screen, and monitoring the current state of the retractable screen comprises:

determining the current state of the retractable screen as the motion state in response to monitoring that the driving member is in a power-on and operating state; or determining the current state of the retractable screen as the static state in response to monitoring that the driving member is in a power-off state or a power-on and not operating state.

17. A non-transitory computer-readable storage medium storing a computer program which, when executed by a processor, is configured to implement:

monitoring a current state of a retractable screen, wherein the current state comprises a static state and a motion state;

obtaining a target transition animation in response to detecting that the retractable screen is switched from the static state to the motion state, wherein a change in the target transition animation corresponds to the motion state; and replacing a current image displayed on the retractable screen in the static state with the target transition animation, and displaying the target transition animation on the retractable screen in the motion state;

wherein the target transition animation comprises a bottom-layer animation and a motion special effect animation, the retractable screen has a visible region and a hidden region;

wherein the computer program, when executed by the processor, is further configured to implement:

obtaining displacement data of the retractable screen in the motion state; and controlling a displacement of the motion special effect animation relative to the bottom-layer animation according to the displacement data, to make a distance between the motion special effect animation and a boundary line between the visible region and the hidden region less than or equal to a boundary distance threshold at any time.

18. The non-transitory computer-readable storage medium of claim 17, wherein in terms of replacing the current image displayed on the retractable screen in the static state with the target transition animation, the computer program, when executed by the processor, is configured to implement:

displaying the bottom-layer animation in both the visible region and the hidden region to replace the current image displayed on the retractable screen in the static state; and displaying the motion special effect animation on an upper layer of the bottom-layer animation.

19. An electronic device, comprising:

a processor; and a memory configured to store executable instructions of the processor, wherein the processor is configured to execute the executable instructions to execute:

monitoring a current state of a retractable screen, wherein the current state comprises a static state and a motion state;

obtaining a target transition animation in response to detecting that the retractable screen is switched from the static state to the motion state, wherein a change in the target transition animation corresponds to the motion state; and replacing a current image displayed on the retractable screen in the static state with the target transition animation, and displaying the target transition animation on the retractable screen in the motion state;

wherein the target transition animation comprises a bottom-layer animation and a motion special effect animation, the retractable screen has a visible region and a hidden region;

wherein the processor is further configured to execute the executable instructions to execute:

obtaining displacement data of the retractable screen in the motion state; and controlling a displacement of the motion special effect animation relative to the bottom-layer animation according to the displacement data, to make a distance between the motion special effect animation and a boundary line between the visible region and the hidden region less than or equal to a boundary distance threshold at any time.

* * * * *